(12) United States Patent
Ravela (10) Patent No.: US 9,046,627 B2
(45) Date of Patent: Jun. 2, 2015

(54) GENERATING A FORECAST BY FIELD COALESCENCE

(71) Applicant: Massachusetts Institute of Technology, Cambridge, MA (US)

(72) Inventor: Srinivas Ravela, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 160 days.

(21) Appl. No.: 13/904,058

(22) Filed: May 29, 2013

(65) Prior Publication Data

US 2013/0322681 A1 Dec. 5, 2013

Related U.S. Application Data

(60) Provisional application No. 61/653,096, filed on May 30, 2012.

(51) Int. Cl.
| | |
|---|---|
| G06K 9/00 | (2006.01) |
| G01W 1/10 | (2006.01) |
| G06T 5/50 | (2006.01) |
| G06T 7/20 | (2006.01) |

(52) U.S. Cl.
CPC .. *G01W 1/10* (2013.01); *G06T 5/50* (2013.01); *G06T 7/2066* (2013.01)

(58) Field of Classification Search
None
See application file for complete search history.

(56) References Cited

U.S. PATENT DOCUMENTS

| | | | |
|---|---|---|---|
| 5,959,567 A | 9/1999 | Wolfson et al. | |
| 6,340,946 B1 * | 1/2002 | Wolfson et al. | 342/26 R |
| 2003/0156734 A1 * | 8/2003 | Wolfson et al. | 382/100 |
| 2004/0239550 A1 * | 12/2004 | Daly, Jr. | 342/26 B |
| 2007/0005249 A1 * | 1/2007 | Dupree et al. | 702/3 |
| 2009/0224965 A1 * | 9/2009 | Venkatachalam et al. | 342/26 R |

FOREIGN PATENT DOCUMENTS

| | | | | |
|---|---|---|---|---|
| EP | 0851240 | * | 7/1998 | G01S 13/95 |
| EP | 0851240 A2 | | 7/1998 | |
| WO | 9704600 A1 | | 2/1997 | |

OTHER PUBLICATIONS

Yang, et al "Deformation Invariant Image Matching by Spectrally Controlled Diffeomorphic Alignment", I EEE 12th International Conference on Computer Vision, 2009; pp. 1303-1310.*

S. Ravela, K. Emanuel, D. McLaughlin, "Data Assimilation by Field Alignment," PhysicaD, 230(1):127-145, 2007; 19 pgs.

C.Yang, S. Ravela, "Deformation Invariant Image Matching by Spectrally Controlled Diffeomorphic Alignment," Proc. ICCV, pp. 1303-1310, 2009; 8 pgs.

(Continued)

*Primary Examiner* — Amara Abdi
(74) *Attorney, Agent, or Firm* — Schmeiser, Olsen & Watts LLP (57) ABSTRACT

A method for generating a coalesced image includes receiving a plurality of fields for a geographical region. A set of forces is determined for each of the fields by multiplying a gradient of a respective one of the fields with a difference between the respective one of the fields and each of the other fields. A net influence for each field is determined by averaging each of the forces associated with the respective field. A spectral filter is applied to each net influence to generate a respective value of a mode of motion used to deform each field and then displace each field until each field coalesces with each other field.

20 Claims, 8 Drawing Sheets

(56) References Cited

OTHER PUBLICATIONS

S. Ravela, "Quantifying Uncertainty for Coherent Structures," Procedia Computer Science, vol. 9, 2012, pp. 1187-1196; 10 pgs.

International Search Report & Written Opinion in counterpart international patent application No. PCT/US13/42961, mailed on Mar. 27, 2014; 12 pages.

Yang, Christopher M. and Sai Ravela, "Deformation Invariant Image Matching by Spectrally Controlled Diffeomorphic Alignment", 2009 IEEE 12th International Conference on Computer Vision, Sep. 1, 2009, 8 pages.

Yang, Christopher Minzer, "Sepctral Control of Viscous Alignment for Deformation Invariant Image Matching", Thesis, Massachusetts Institute of Technology, Cambridge, MA, Jun. 2009; 17 pages.

Paquin and Dubois, "A Spatio-Temporal Gradient Method for Estimating the Displacement Field in Time-Varying Imagery", Computer Vision, Graphics, and Image Processing, vol. 20, No. 2, Oct. 1, 1982; 17 pages.

* cited by examiner

GENERATING A FORECAST BY FIELD COALESCENCE

CROSS-REFERENCE TO RELATED APPLICATIONS

This application is a utility application claiming priority to co-pending U.S. Provisional Application Ser. No. 61/653,096 filed on May 30, 2012 entitled "QUANTIFYING UNCERTAINTY FOR COHERENT STRUCTURES," the entirety of which is incorporated by reference herein.

GOVERNMENT RIGHTS IN THE INVENTION

This invention was made with government support under Grant No. FA8721-05-C-0002 awarded by the Federal Aviation Administration, Grant No. AFOSR (FA9550-12-1-0313) awarded by the Air Force Office of Scientific Research and under Grant Nos. NSF DBI 0640629 and NSF DBI-1146747 awarded by the National Science Foundation. The government has certain rights in this invention.

FIELD OF THE INVENTION

The present invention relates generally to the processing of spatial fields for generating a forecast. More specifically, the invention relates to generating a forecast image by quantifying uncertainty in coherent structures.

BACKGROUND

Short term and mid-range weather predictions (e.g., 30 minutes to several hours) of the location of organized storms and other weather features are extremely important to many sectors of the population. For example, aviation systems, traffic information systems, power companies and commuters realize important safety and economic benefits from accurate predictions of organized storms.

Cross-correlation image processing has been applied to weather radar images to generate short-term forecast images. For example, a method for predicting the motion of an organized storm is disclosed in U.S. Pat. No. 5,959,567, incorporated by reference herein. The method is based on applying an image filter matched to the structure of an organized storm to weather radar images at different times to thereby generate filtered weather radar images. An image tracker performs a cross-correlation of the filtered images to generate an array of track vectors that represents the movement of weather features, such as organized storms, in the time interval between the images. The track vectors are applied to a weather radar image to advect meteorological features and thereby generate a forecast image for a future time.

The method based on cross-correlation image processing does not have constraints imposed on the track vectors. In some instances, highly discontinuous track vector fields are produced that are contrary to a practical meteorological environment and therefore do not yield accurate forecast images. For example, track vectors at adjacent grid points in the array can cross over each other or point in opposite directions. The method of cross-correlation image processing also does not coalesce, nor probably acknowledge the uncertainty in each of the images.

BRIEF SUMMARY

In one aspect, the invention features a method of generating a coalesced image. The method comprises (a) receiving a plurality of fields for a geographical region, each of the fields comprising values of a field parameter according to a location in the geographical region. The method also includes (b) determining a set of forces for each of the fields, each set of forces being generated by multiplying a gradient of a respective one of the fields with a difference between the respective one of the fields and each of the other fields. The method also includes (c) determining a net influence for each of the fields by averaging each force within each set of forces of a respective one of the fields. The method also includes (d) applying a spectral filter to each net influence for each of the fields to generate a value of a mode of motion corresponding to the spectral filter, each value of the mode motion associated with a respective one of the fields. The method also includes (e) deforming each of the plurality of fields according to the value of the mode of motion associated with the respective one of the fields. Steps (b) through (e) are repeated, wherein each of the fields of steps (b) through (e) is a last deformed field from the plurality of fields, and each repetition of step (d) comprises applying the spectral filter having a wave-number greater than a wave-number of a last applied spectral filter. The method further includes determining a displacement field for each of the fields based on the value of the mode of motion for the respective one of the fields determined from each repetition of step (e).

In another aspect, the invention features a method for Nowcasting storms. The method comprises (a) receiving a plurality of fields for a geographical region, each of the fields comprising values of a meteorological parameter according to a location in the geographical region, and the plurality of fields comprised of a combination of data-driven fields and numerical model fields. The method also includes (b) determining a set of forces for each of the fields, each set of forces being generated by multiplying a gradient of a respective one of the fields with a difference between the respective one of the fields and each of the other fields. The method also includes (c) determining a net influence for each of the fields by averaging each force within each set of forces of a respective one of the fields. The method also includes (d) applying a spectral filter to each net influence for each of the fields to generate a value of a mode of motion corresponding to the spectral filter, each value of the mode motion associated with a respective one of the fields. The method also includes (e) deforming each of the plurality of fields according to the value of the mode of motion associated with the respective one of the fields. Steps (b) through (e) are repeated, wherein each of the fields of steps (b) through (e) is a last deformed field from the plurality of fields, and each repetition of step (d) comprises applying the spectral filter having a wave-number greater than a wave-number of a last applied spectral filter. The method further includes determining a displacement field for each of the fields based on the value of the mode of motion for the respective one of the fields determined from each repetition of step (e) and applying the displacement field for each of the fields to each of the fields to generate a coalesced image.

In another aspect the invention features a computer program product for generating a forecast weather image. The computer program product includes a computer-readable storage medium having computer readable program code. The computer readable program code includes program code for executing various steps of the methods described above.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Embodiments of methods and apparatus described herein provide for the generation of forecasts through coalescence of fields, an image for example. The method is based on a new framework for using field alignment to quantify uncertainty from an ensemble of coherent structures. Field alignment is achieved by displacing the coordinates of a field or image to reduce or minimize a measure of dissimilarity between the image and a mean field. The method, called Coalescence, discovers a mean field under non-trivial misalignments of fields with complex shapes, made more difficult in the presence of sparse observations. In conjunction with a continuation method called Scale Cascaded Alignment (SCA), simpler explanations of error are obtained before cascading to more complex solutions. For example, a translation of a field is a simpler solution than an expansion, rotation or shear. In one embodiment, the fields are weather images and include values for a vertically integrated liquid (VIL), wind speed or barometric pressure. In another embodiment, the fields are oceanographic images includes values for water current. The limitations of previous solutions to representing errors are particularly apparent in mesoscale meteorological phenomena such as thunderstorms, squall lines, wild fires, hurricanes, precipitation and fronts.

Filters are applied to approximate viscous alignment and to thereby achieve displacement fields having meaningful structure. In various embodiments a power-law energy spectrum is utilized for addressing deformations in the displacement field (also called an advection field) through the application of a set of Gabor filters that approximates a power law. Thus, the method generally avoids problems that would otherwise arise from discontinuities present in track vector fields generated by cross-correlation image processing techniques. In the various embodiments described below, the weather images are generally referred to as weather radar images; however, it will be recognized that the method can be performed with other types of weather images that include image data that may be generated or obtained without the use of radar. For example, other types of weather images include satellite irradiance images, infrared sounding images and hyperspectral images.

In a preferred embodiment, the following logical sequence is performed. A correlation of fields is improved by using viscous alignment. This is more generally represented by a power-law spectrum, which represents turbulent motions and can be approximated by a sum of spectral filters, such as Gabor filters. The correlation is solved as a continuation from a low wave-number Gabor to a high wave-number Gabor, which allows the factoring of total deformation into modes of motion where simpler motions precede more complex motions. This way of factoring allows the use of more important modes for prediction and marginalizes the less important ones, which cannot be done by mere viscous alignment.

Figure 1A:
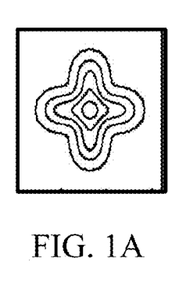
FIG. 1A is an illustration of a cross-pattern.
Figure 1B:
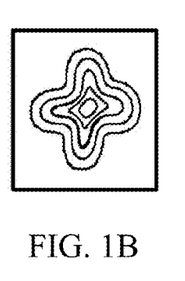
FIG. 1B is a illustration of the cross-pattern in FIG. 1A after deformation with a smoothness constraint.
Figure 1C:
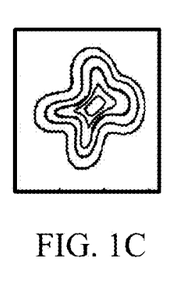
FIG. 1C is a illustration of the cross-pattern in FIG. 1B after further deformation with the smoothness constraint.
Figure 1D:
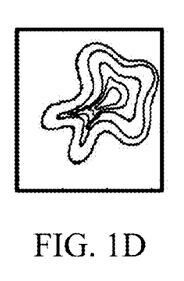
FIG. 1D is a illustration of the cross-pattern in FIG. 1C after further deformation with the smoothness constraint.
Figure 1E:
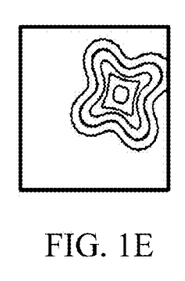
FIG. 1E is a illustration of the cross-pattern in FIG. 1D after final deformation with the smoothness constraint.
Figure 2A:
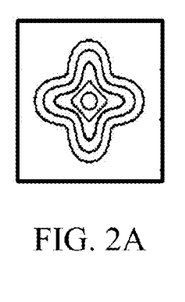
FIG. 2A is an illustration of a cross-pattern similar to the cross-pattern in FIG. 1A.
Figure 2B:
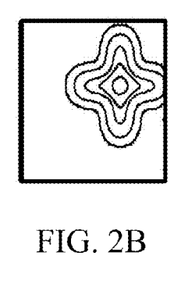
FIG. 2B is a illustration of the cross-pattern in FIG. 2A after deformation with a scaled cascaded alignment (SCA) constraint.
Figure 2C:
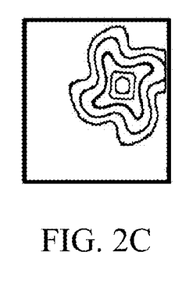
FIG. 2C is a illustration of the cross-pattern in FIG. 2B after further deformation with the SCA constraint.
Figure 2D:
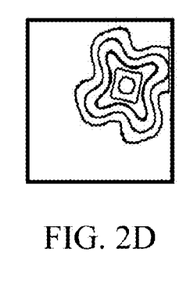
FIG. 2D is a illustration of the cross-pattern in FIG. 2C after further deformation with the SCA constraint.
Figure 2E:
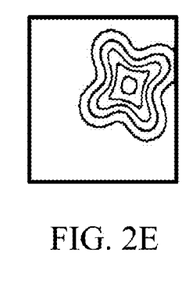
FIG. 2E is a illustration of the cross-pattern in FIG. 2D after final deformation with the SCA constraint.

With reference to FIG. 1A through FIG. 1E and FIG. 2A though FIG. 2E, the importance of proper constraints on the deformation of a grid of a field is demonstrated. Multiple fields (e.g. weather forecasts in one embodiment) emerge from various simulations of how a storm should evolve. Coalescence finds the most probable forecast from the various fields by deforming the fields. Deforming includes a linear displacement as well as rotation, shear and other deformations necessary to get a unified field out the various field estimates.

During the process of grid deformation, previous solutions have used smoothness constraints as shown in FIG. 1A through FIG. 1E, resulting in a complex deformation sequence that can produce unacceptably distorted estimates. In particular, the cross-pattern in FIG. 1A is deformed in an iterative fashion to produce the image in FIG. 1B, then FIG. 1C, then FIG. 1D and finally FIG. 1E. The cross-pattern of FIG. 1A is translated in position and rotated to produce the cross-pattern of FIG. 1E. The advantages of using SCA in the present invention are shown in FIG. 2A through FIG. 2E. The cross-pattern of FIG. 2A is iteratively deformed to produce the image in FIG. 2B, then FIG. 2C, then FIG. 2D and finally FIG. 2E. The resulting cross-pattern in FIG. 2E shows the same translated position and rotation as in FIG. 1E but without the complex distortion shown in FIG. 1D. The use of SCA returns the simplest solution and improved control of deformations compared to the previous approach relying on smoothness constraints.

Figure 3A:
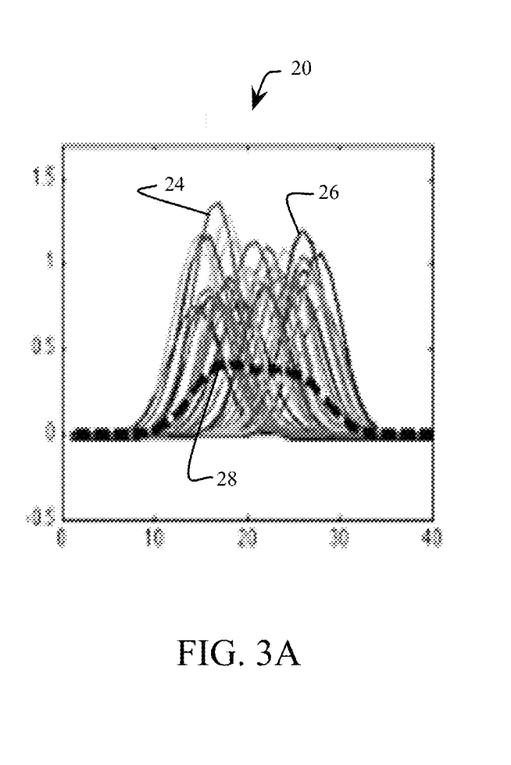
FIG. 3A is a graphical view of an ensemble of one-dimensional fronts.
Figure 3B:
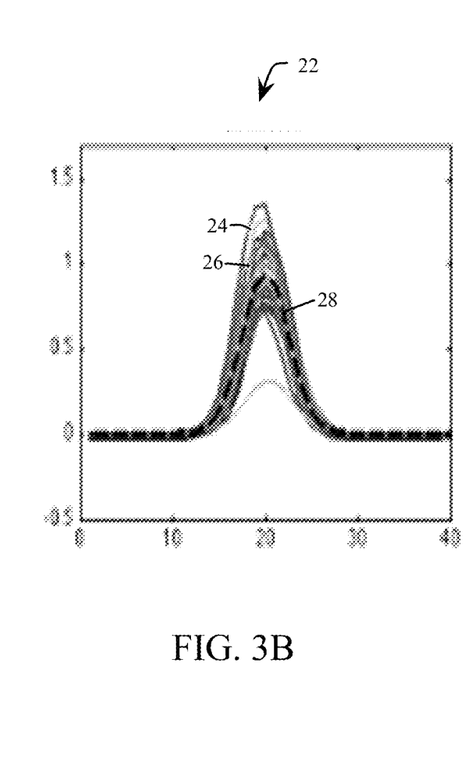
FIG. 3B is a graphical view of the one-dimensional fronts in FIG. 1A after coalescence.

FIG. 3A and FIG. 3B demonstrate an additional advantage of the present invention with respect to uncertainty quantification. In FIG. 3A, an ensemble 20 of one-dimensional fronts with amplitude and position errors is shown. For example, front 24 and front 26 are two estimates of a weather front, each differing in position and amplitude. If we used a simplistic estimate of how the front should appear we would calculate the mean 28 of the fields, which would several distort the shape and amplitude of the fronts. Furthermore, in an example where the fronts represent hurricanes, the simplistic estimate of a mean field 28 might produce a front with multiple vortices or perhaps no vortices at all. By using the technique of Coalescence, the results of which are shown in FIG. 3B, the mean field 28 is calculated by marginalizing relative position errors between the fronts. This involves an N-body solution where each member (e.g field) in the ensemble gravitates to the others under the collective influence of the remaining N−1 members. This influence results from minimizing the displacement field between each member and a mean field.

Figure 4A:
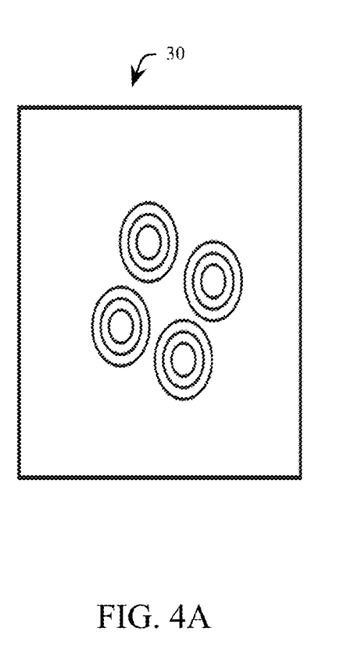
FIG. 4A is an illustration of a gridded field.
Figure 4B:
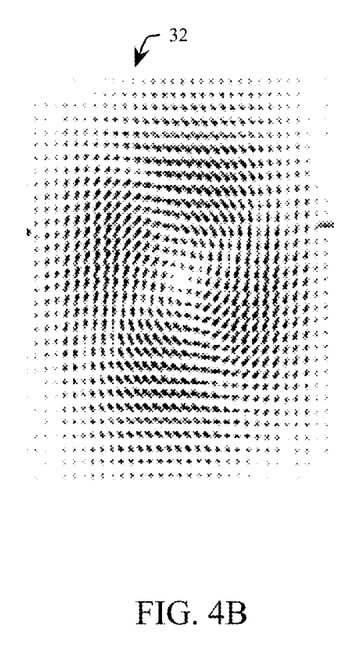
FIG. 4B is an illustration of a displacement field.
Figure 4C:
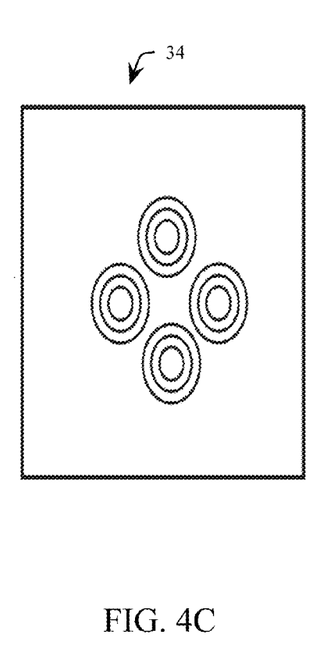
FIG. 4C is an illustration of the gridded field in FIG. 4A after being displaced by the displacement field in FIG. 4B.

FIG. 4A, FIG. 4B and FIG. 4C illustrate the process of deforming a field 30 represented by a grid or array of observations of four objects into a new field 34. The new field 34 has been rotated from the field 30 by multiplying each of the grid points in the image 30 by a deformation field 32. The deformation field 32 is an array of vectors with each vector representing a direction and magnitude with which to displace each grid point of the field 30.

Figure 5:
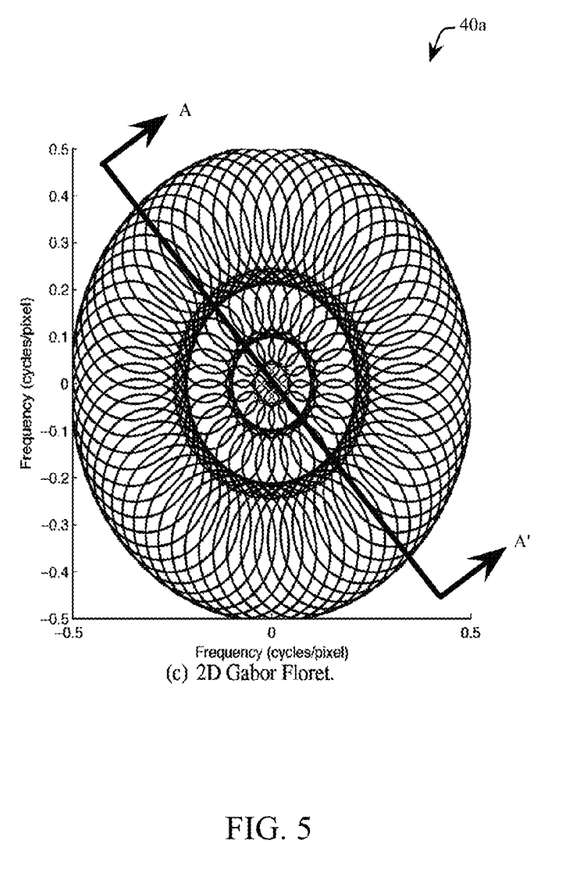
FIG. 5 is an illustration of the coalescence of three weather images according to an embodiment of the present invention.
Figure 6:
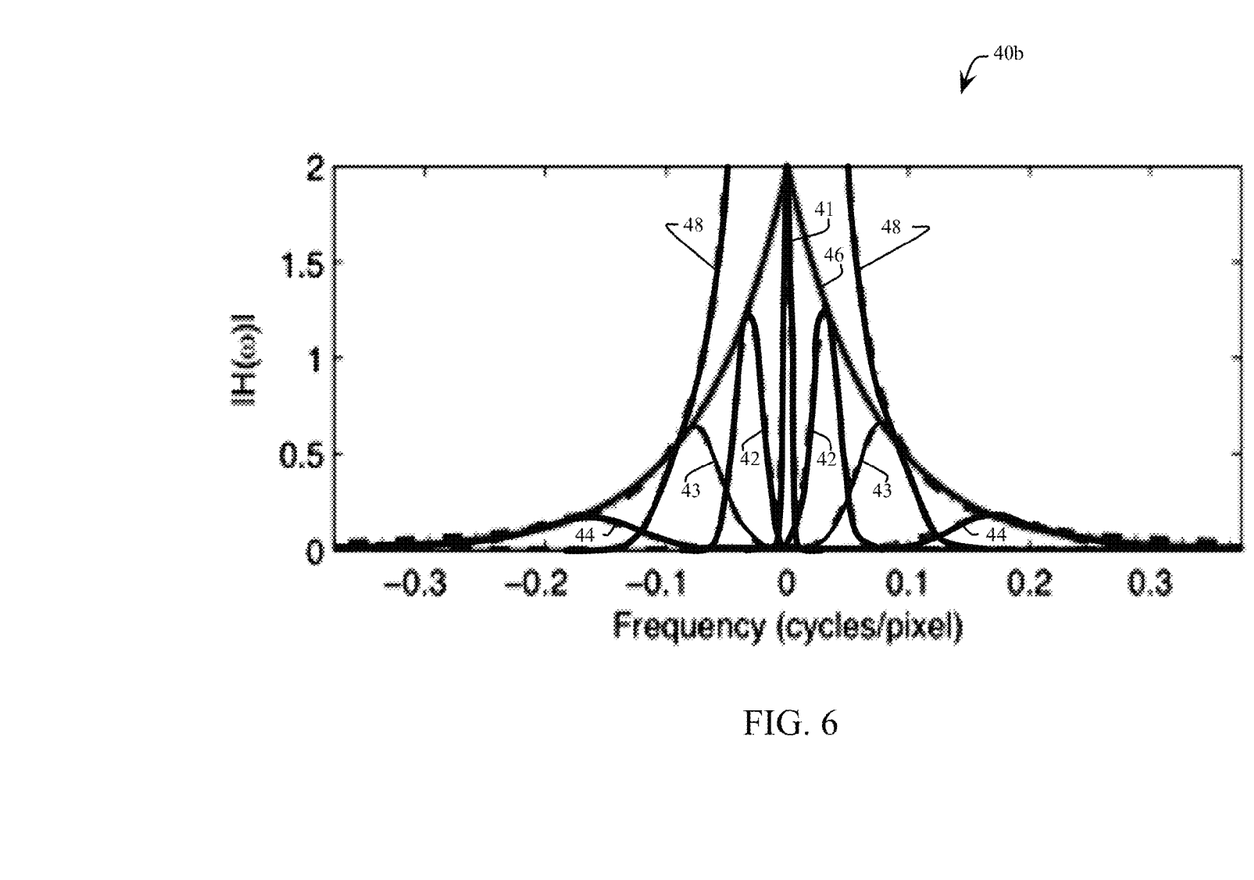
FIG. 6 is a three-dimensional graphical presentation of the sum of a plurality of Gabor filters that approximates a power law distribution.

FIG. 5 is a three-dimensional representation of the sum of a plurality of Gabor filters. FIG. 6 is a cross-sectional view of the sum of the Gabor filters shown in FIG. 5 where the lines depict the different Gabor filters. The first Gabor filter is a Gaussian 41 having a center frequency of zero. Each higher order Gabor filter is a gaussian ring (e.g., 42, 43, 44) having a unique radius or center frequency that corresponds to a higher wave-number. Each Gabor filter has a maximum value at its center frequency according to an exponential envelope 46, which approximates a power law 48.

Figure 7:
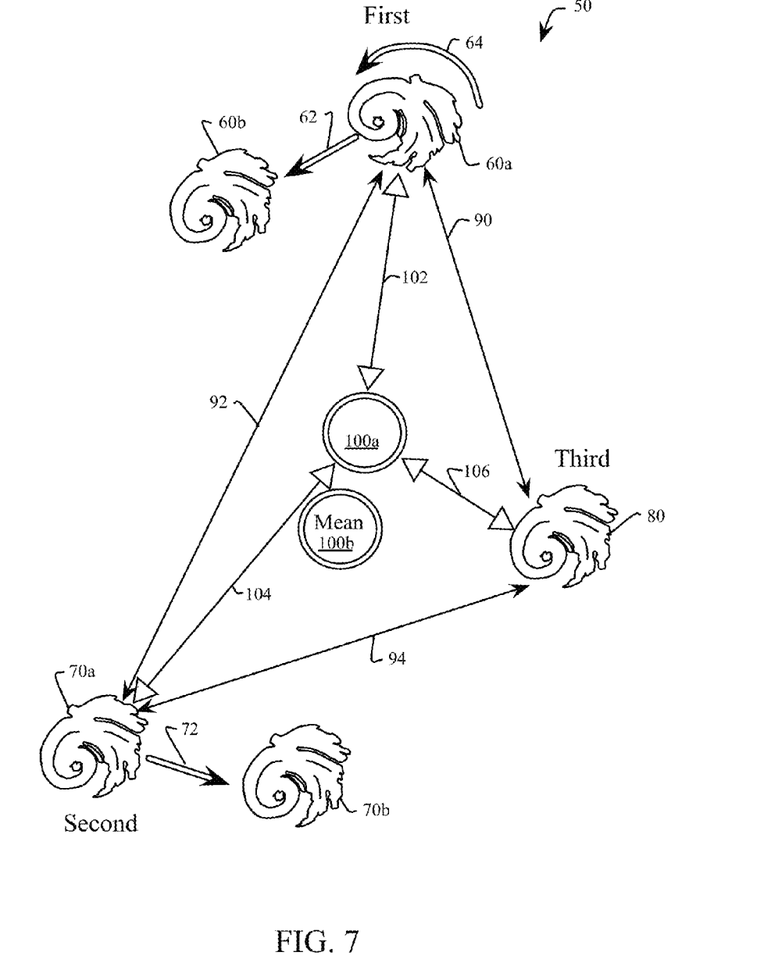
FIG. 7 is a cross-sectional view of the sum of the Gabor filters taken along A-A' as shown in FIG. 4.

FIG. 7 illustrates one embodiment 50 of the method of coalescence including three estimates of a hurricane, (e.g. a type of field) based on lag forecasting. Lag forecasting produces a series of estimates or forecasts that coincide with a future point in time. For example, a forecast made eight hours ago for an event eight hours later would be compared to a forecast made two hours ago for an event two hours later, both forecasts being for the present time but producing different estimates of storm position, amplitude and characteristics. The number of forecasts can be simply two or alternatively can be hundreds or more. Forecasts can also be based on different models without lag forecasting (e.g. multiple forecasts made at the present time for an future event). In a preferred embodiment, the forecasts are NowCasts, which are weather predictions for a very short upcoming period, typically a period of a few hours.

Three hurricanes are shown in FIG. 7, to illustrate the method of coalescence. A first estimate 60a, a second estimate 70a and a third estimate 80 each yield three different positions and rotations of the hurricane. Each of these estimates contains uncertainty and can be reconciled sufficiently with the coalescence method to produce useful results by deforming (e.g. moving, rotating and morphing) each estimate until there is a reasonable match between them. Each estimate exerts an influence or force on each other estimate to align the estimates. For example, when there is a clustering of estimates, the cluster will inherently be given more weight than an outlier. Specifically, estimate 60a is influenced by the various modes of motion (e.g. translation, rotation, shear and others) of estimates 70a and estimate 80. Estimate 70a is influenced by the various modes of motion of estimates 60a and 80. Estimate 80 is influenced by the various modes of motion of estimates 60a and 70a. A mean field 100a is computed between the three estimates 60a, 70a and 80 shown in FIG. 7 and used to displace each of the estimates 60a, 70a and 80. Similarly, each of the displacements alters the calculated mean. The process of adjusting the displacements and the mean continues in an iterative fashion until there is no longer a substantial change in either the displacements or the mean, thus yielding a mean field representative of a coalesced image.

Referring to FIG. 7 the initial estimates 60a, 70a and 80 produce a mean field 100a. Specifically, a gradient of the field estimate (e.g. 60a) is multiplied by an error value 90 between the estimate 60a and 80 to determine a Force between 60a and 80. The force between 60a and 70a is calculated by multiplying the gradient of 60a by an error value 92 between 60a and 70a. The forces imposed by 70a and 80 on estimate 60a are averaged. A spectral filter, for example a Gabor filter, is used to determine a deformation of estimate 60a. A first order Gabor filter 41 as shown in FIG. 6, having a wave-number of zero is first used to calculate a first mode of motion. For example, in one embodiment the first mode of motion corresponds strongly to translation and results in a deformation 62 of estimate 60a. Similarly, the first mode of motion for estimate 70a returns a deformation 72 corresponding to a translation, and no deformation for estimate 80. In one example, the process of deforming each estimate for the first order Gabor filter continues until there is no further deformation of the estimated fields 60a, 70a, 80. Subsequently, the next Gabor filter 42 is chosen with the next higher wave-number to calculate the next mode of motion. In the embodiment shown in FIG. 7, the next mode of motion corresponds strongly to rotation, resulting in a deformation 64 of estimate 60a but no further deformation of estimates 70a or 80. Each higher order wave-number is applied (e.g. 43, then 44) until the last Gabor filter is applied. Each of the modes of motion determined for each field estimate are applied to deform the respective field estimates. In FIG. 7, the result is a displacement of the field estimate 60a to 60b, a displacement of the field estimate 70a to 70b and no displacement of the field estimate 80. A new mean field 100b is then calculated based on the average of the displaced fields 60b, 70b and 80 and represents the forecasted field that reconciles the various errors present in the initial estimates 60a, 70a and 80.

Figure 8:
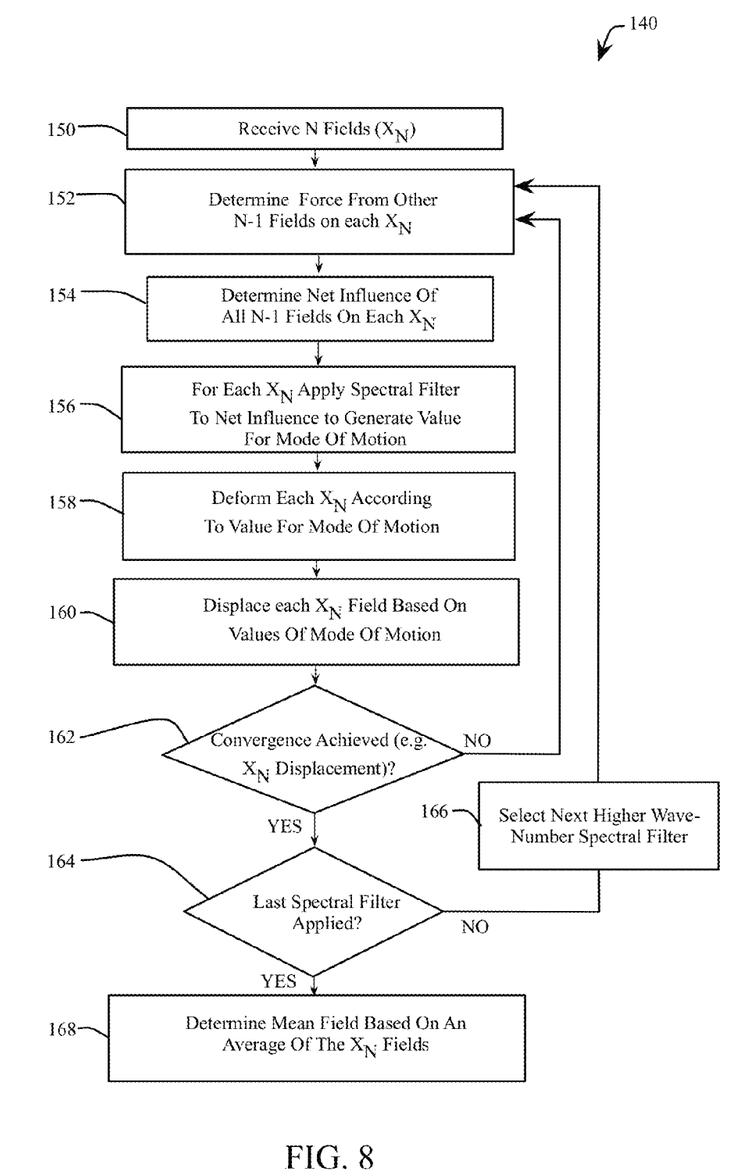
FIG. 8 is a flowchart representation of an embodiment of a method for generating a coalesced image according to an embodiment of the present invention.

FIG. 8 is a flowchart representation of one embodiment of a method 140 for generating a forecast weather image (e.g. a type of field). Weather radar images are received (step 150) from an image provider. The method 140 continues by determining (step 152) a Force from each of the other images by determining the gradient of the field multiplied by the error between the respective field and another field, thus effectively projecting the error between fields into gradient space. The average of all the forces on each field is determined as a Net Influence at step 154.

The Net Influence is then filtered at step 156 using a spectral filter (a Gabor filter for example), to generate a value for a mode of motion. The motion can be of any step size, including a random step size in the direction of the force. A filter with a wave-number of zero, shown as 41 in FIG. 6 is first used to determine the simplest error explanation, a global translation of the image. The image is then deformed (step 158) for the first mode according to the value and then displaced (step 160) based on the cumulative modes of motion determined by application of the preceding Gabor filters. If there is no change in displacement, then convergence is achieved as determined at step 162, otherwise the method 140 returns to step 152 and continues through step 162 (where deformation is based on deforming the last deformed image) until convergence and a final value is determined for the first mode of motion. The final value of the first mode of motion represents the global translation between of the initial radar image and a subsequent radar image that results in either no further deformation of the image or no change in the calculated mean field. In other words, the mean field is a best approximation to the deformed fields.

Subsequently, a second spectral filter, 42 in FIG. 6, having a next higher wave-number 0.5 is selected (step 166). Iterative application of the second Gabor filter and deformation is performed until convergence occurs and a final value for the second mode of motion is determined (steps 152 through 162). Additional Gabor filters, each having an increased wave-number relative to the last applied Gabor filter, are applied and values for higher modes of motion are determined in a similar manner until it is determined (step 164) that all the Gabor filters have been applied. The method 140 continues at step 168 by determining the mean field based on an average of the fields fully displaced by all the values of mode of motion. The final mean field represents the coalesced image.

The number of Gabor filters employed in the method 140 can be selected according to a particular application. In various embodiments, the Gabor filters have wave-numbers of 0, 0.5, 1, 2, 4, 8 and so on such that each filter has a wave-number that is twice the wave-number of the preceding filter. In various embodiments, the number of Gabor filters is between 8 and 12, inclusive, although this is not a requirement. For example, the particular choice of the number of filters can be limited according to the image size expressed in pixels. In another example, the number of filters used is selected based on the desired modes of motions to be extracted from the images (e.g., rotation and local shear). In other embodiments, additional constraints are imposed in addition to those from the SCA. Each Gabor filter application captures a different scale of motion and leaves increasingly negligible gradient error images for subsequent higher wave-number Gabor filters to resolve. Moreover, the lower frequency Gabor filters can accurately capture advection associated with large scale temporally coherent meteorological events that persist over longer durations while less temporally coherent local meteorological events correspond to the more attenuated higher frequency Gabor filters.

Figure 9:
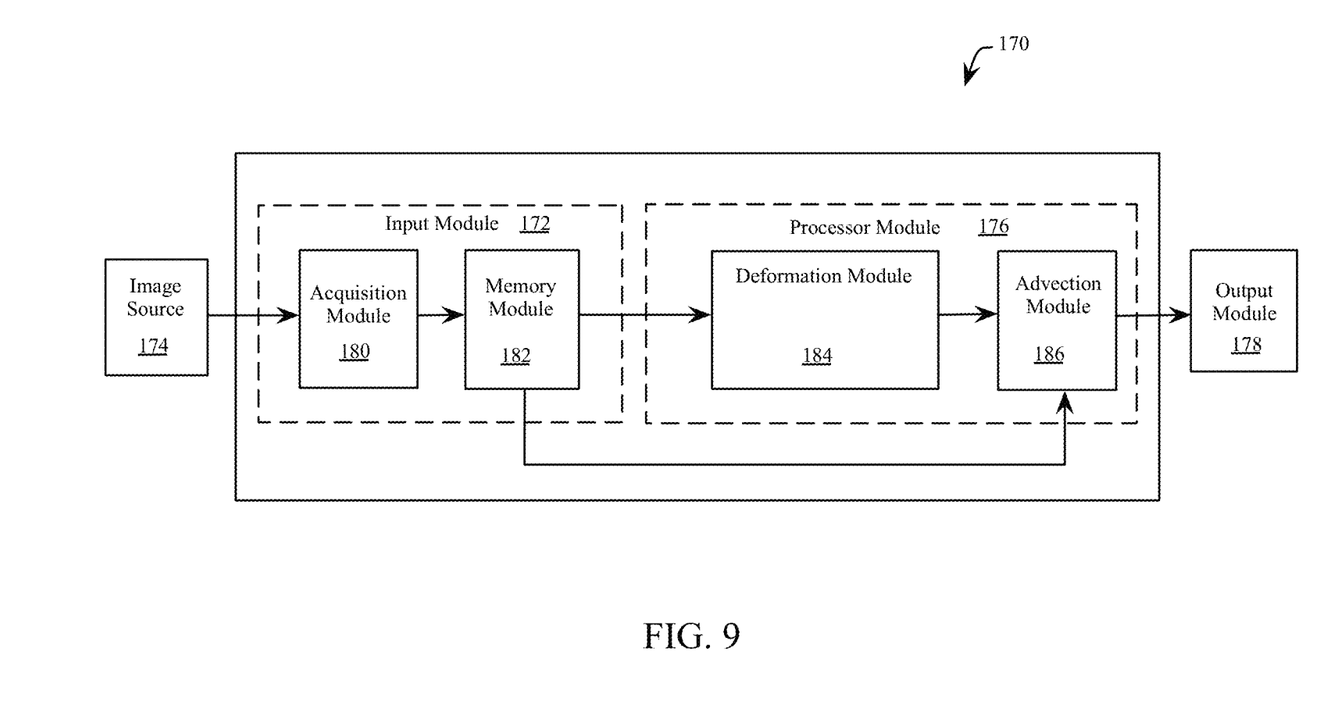
FIG. 9 is a block diagram of an embodiment of an apparatus for generating a coalesced image according to the invention.

FIG. 9 is an apparatus 170 for generating a forecast weather image that includes an input module 172 and a processor module 176. The input module 172 receives weather radar image data from a weather radar image source 174. The input module 172 provides the image data to the processor module 176, which generates a forecast weather radar image available at an output module 178. The forecast weather radar image at the output module 178 may be provided as data that can be stored, transmitted or further processed. In one embodiment, the output module 178 includes a display for graphical presentation of the forecast weather radar image to a user.

The input module 172 includes an acquisition module 180 and a memory module 182 to receive and store weather radar images for processing by the processor module 176. The acquisition module 180 initiates transfer of weather radar images from the image source 174 (e.g., remote computer system, satellite receiver and processor, Internet server or other device capable of transmitting weather radar images). The memory module 182 is any device capable of temporary or permanent storage of the weather radar image data.

The processor module 176 includes a deformation module 184 and an advection module 186. The deformation module 184 determines a Net Influence as described for FIG. 8. The advection module 186 applies the determined displacement field based on the values of mode of motion, to each of the received weather radar images stored in the memory module 182 to determine a coalesced image.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of generating a coalesced image comprising:
(a) receiving a plurality of fields for a geographical region, each of the fields comprising values of a field parameter according to a location in the geographical region;
(b) determining a set of forces for each of the fields, each set of forces being generated by multiplying a gradient of a respective one of the fields with a difference between the respective one of the fields and each of the other fields;
(c) determining a net influence for each of the fields by averaging each force within each set of forces of a respective one of the fields;
(d) applying a spectral filter to each net influence for each of the fields to generate a value of a mode of motion corresponding to the spectral filter, each value of the mode motion associated with a respective one of the fields;
(e) deforming each of the plurality of fields according to the value of the mode of motion associated with the respective one of the fields;
(f) repeating steps (b) through (e), wherein each of the fields of steps (b) through (e) is a last deformed field from the plurality of fields, and each repetition of step (d) comprises applying the spectral filter having a wave-number greater than a wave-number of a last applied spectral filter; and
(g) determining a displacement field for each of the fields based on the value of the mode of motion for the respective one of the fields determined from each repetition of step (e).

2. The method of claim 1 wherein step (d) comprises iteratively applying the spectral filter to each net influence for each of the fields to determine the values of the mode of motion corresponding to the spectral filter.

3. The method of claim 1 further comprising applying the displacement field for each of the fields to each of the fields to generate a coalesced image.

4. The method of claim 1 wherein the field parameter is a meteorological parameter.

5. The method of claim 1 wherein the field parameter is an oceanographic parameter.

6. The method of claim 1 wherein each field is generated by a temporally separated lag forecast.

7. The method of claim 1 wherein the values of a field parameter are values of vertically-integrated-liquid.

8. The method of claim 1 wherein the spectral filters are Gabor filters.

9. The method of claim 1 wherein the spectral filter that is first applied has a wave-number of zero and describes a global translation mode of motion.

10. The method of claim 1 wherein the sum of spectral filters approximates a power law.

11. The method of claim 10 wherein the power law is approximated with a Laplace distribution.

12. The method of claim 1 further comprising applying the displacement field for each field to the respective field to generate an interim coalesced image, and adjusting the amplitude of the interim coalesced image to generate a final coalesced image.

13. A method for Nowcasting storms comprising:
(a) receiving a plurality of fields for a geographical region, each of the fields comprising values of a meteorological parameter according to a location in the geographical region, and the plurality of fields comprised of a combination of data-driven fields and numerical model fields;
(b) determining a set of forces for each of the fields, each set of forces being generated by multiplying a gradient of a respective one of the fields with a difference between the respective one of the fields and each of the other fields;
(c) determining a net influence for each of the fields by averaging each force within each set of forces of a respective one of the fields;
(d) applying a spectral filter to each net influence for each of the fields to generate a value of a mode of motion corresponding to the spectral filter, each value of the mode motion associated with a respective one of the fields;

(e) deforming each of the plurality of fields according to the value of the mode of motion associated with the respective one of the fields;

(f) repeating steps (b) through (e), wherein each of the fields of steps (b) through (e) is a last deformed field from the plurality of fields, and each repetition of step (d) comprises applying the spectral filter having a wave-number greater than a wave-number of a last applied spectral filter;

(g) determining a displacement field for each of the fields based on the value of the mode of motion for the respective one of the fields determined from each repetition of step (e); and (h) applying the displacement field for each of the fields to each of the fields to generate a coalesced image.

14. The method of claim 13 wherein the data-driven fields are based on an LLExtrap extrapolation method.

15. The method of claim 13 wherein the numerical model fields are based on a High Resolution Rapid Refresh predictive model.

16. The method of claim 13 wherein the spectral filters are Gabor filters and the sum of spectral filters approximates a power law.

17. A computer program product for generating a forecast weather image, the computer program product comprising:
a non-transitory computer-readable storage medium having computer readable program code embodied therewith, the computer readable program code comprising:

(a) computer readable program code configured to receive a plurality of fields for a geographical region, each of the fields comprising values of a field parameter according to a location in the geographical region;

(b) computer readable program code configured to determine a set of forces for each of the fields, each set of forces being generated by multiplying a gradient of a respective one of the fields with a difference between the respective one of the fields and each of the other fields;

(c) computer readable program code configured to determine a net influence for each of the fields by averaging each force within each set of forces of a respective one of the fields;

(d) computer readable program code configured to apply a spectral filter to each net influence for each of the fields to generate a value of a mode of motion corresponding to the spectral filter, each value of the mode motion associated with a respective one of the fields;

(e) computer readable program code configured to deform each of the plurality of fields according to the value of the mode of motion associated with the respective one of the fields;

(f) computer readable program code configured to repeat steps (b) through (e), wherein each of the fields of steps (b) through (e) is a last deformed field from the plurality of fields, and each repetition of step (d) comprises applying the spectral filter having a wave-number greater than a wave-number of a last applied spectral filter; and (g) computer readable program code configured to determine a displacement field for each of the fields based on the value of the mode of motion for the respective one of the fields determined from each repetition of step (e).

18. The computer program product of claim 17 wherein the (d) computer readable program code is configured to iteratively applying the spectral filter to each of a last gradient error within each set of gradient errors to determine the values of the mode of motion corresponding to the spectral filter.

19. The computer program product of claim 17 wherein the spectral filters are Gabor filters.

20. The computer program product of claim 17 wherein the non-transitory computer readable storage medium further comprises computer readable program code configured to apply the displacement field for each of the fields to each of the fields to generate a coalesced image.

* * * * *